Feb. 28, 1967   A. N. LOVE   3,306,312
PRESSURE REGULATOR
Filed March 5, 1965   3 Sheets-Sheet 1
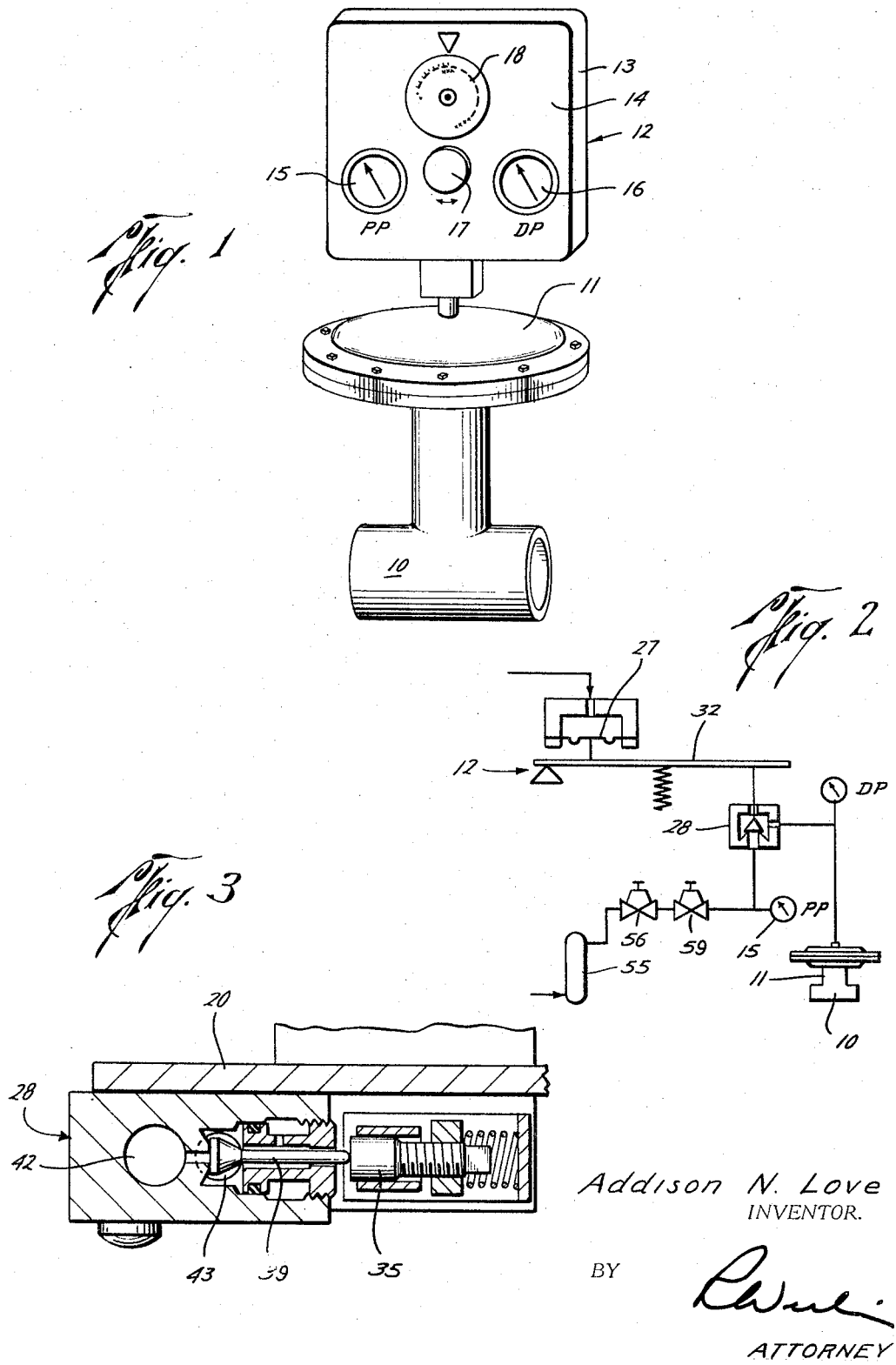
Addison N. Love
INVENTOR.

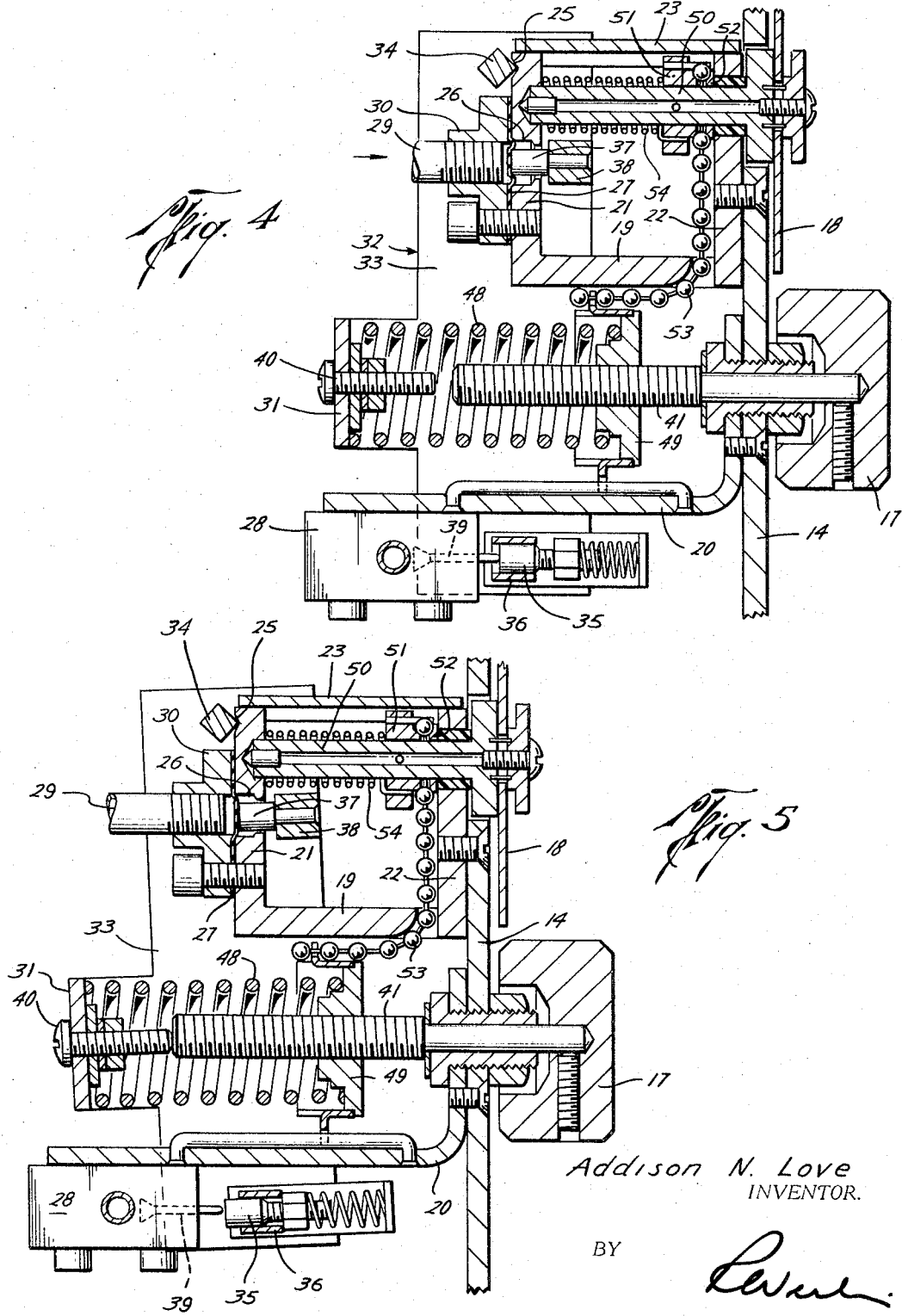

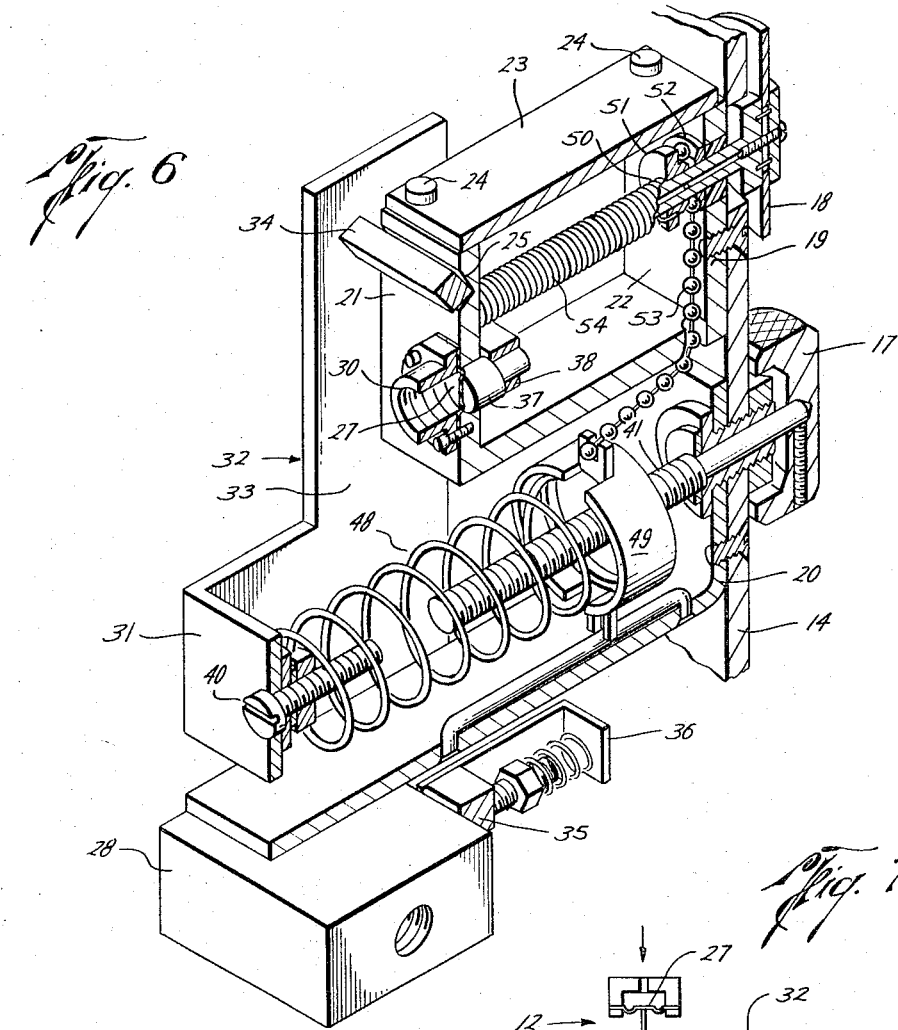
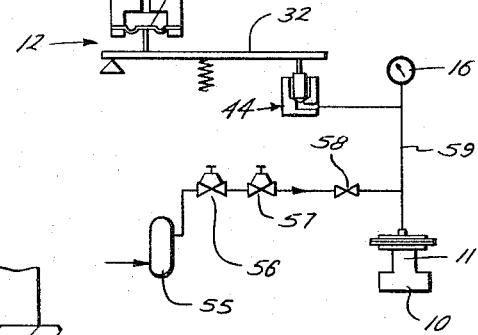
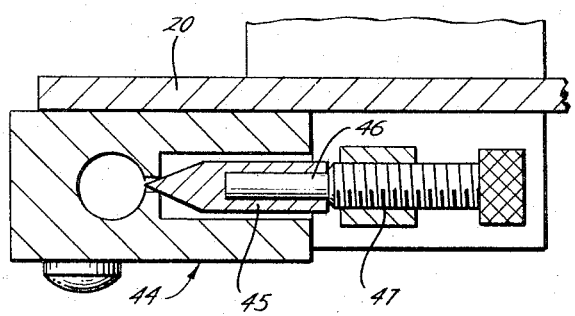
Addison N. Love
INVENTOR.

United States Patent Office 3,306,312
Patented Feb. 28, 1967

3,306,312
PRESSURE REGULATOR
Addison N. Love, Houston, Tex., assignor to Harold Brown Company, a corporation of Texas
Filed Mar. 5, 1965, Ser. No. 437,357
7 Claims. (Cl. 137—82)

This invention relates to pressure sensing devices and is particularly concerned with providing improved sensing and response features in regulators of the type employed to control gas pressures.

In petroleum production operations using gas-lift methods, pressure responsive controls are employed to maintain a predetermined pressure of the gas employed to operate the system. Conventionally, such controls are arranged to continuously sense the pressure of the controlled gas and transmit the sensings to energize means for selectively increasing and decreasing the flow rate from the gas source.

Typically, these devices are comprised of a diaphragm which is expanded and contracted in response to pressure variations in the gas to be controlled. In turn, motion of the diaphragm is translated, usually through mechanical linkage, into opening and closing movement of a valve through which the gas is being delivered to thereby increase or decrease the pressure of the gas under control.

Controls of this type characteristically exhibit a significant lack of sensitivity to small variations in pressure (and hence in flow rate) principally because the diaphragm arrangement presents a relatively large dead band to the actuating medium. When employed with a pilot and motor valve system their accuracy is sometimes affected by the size and type of motor valve employed. They are difficult to calibrate. They do not readily adapt to use of a direct reading attachment and they exhibit other characteristics which detract from their reliability and usefulness.

It is an object of this invention to provide a pressure responsive control device for the regulation of fluid flow which has improved sensitivity to relatively small variations in pressure.

Another object of this invention is to provide a pressure responsive control device with improved adaptability to a variety of motor valves.

A further object of this invention is to provide a pressure responsive regulator having a minimum number of moving parts subject to sliding friction.

Another object of this invention is to provide an improved pressure responsive regulator which will readily adjust to different operating pressures.

Other objects and advantages of this invention will be made apparent by the following general and detailed description of the invention and of one embodiment thereof.

In general, the present invention contemplates a pressure responsive control device in which sliding friction between certain moving parts is eliminated, dead band in the device is substantially reduced and a relatively large sensing force [i.e., about eight percent (8%) of the regulated pressure as compared with about two percent (2%) of the regulated pressure in a conventional device] is employed.

More particularly, in a preferred form of the invention a rolling diaphragm is employed to receive the energizing pressure. Piston means are arranged for movement with the rolling diaphragm. A pre-loaded lever and fulcrum assembly transmits movement of the piston means to a pilot valve arranged to drive a motor valve which will selectively increase and decrease fluid flow for maintenance of a constant pressure.

Further understanding of the invention may be had by reference to the following detailed description of the embodiment shown in the appended drawings.

In the drawings:

FIGURE 1 is an isometric view showing a device embodying the present invention mounted on a motor valve.

FIGURE 2 is a diagrammatic representation of the device shown in FIGURE 1 and shows employment of a snap-acting three-way pilot valve.

FIGURE 3 is an enlarged partial section view detailing the snap-acting pilot valve of FIGURE 4.

FIGURE 4 is an enlarged section view showing the device in balanced position.

FIGURE 5 is an enlarged section view showing the device responding to an increase in activating fluid pressure.

FIGURE 6 is an isometric view partly in section and partly in elevation.

FIGURE 7 is a diagrammatic illustration showing employment of a throttling pilot valve.

FIGURE 8 is an enlarged partial section view of the throttling pilot valve shown in FIGURE 7.

In the illustrated embodiment a pipe 10, used for delivering a liquid or a gas, is outfitted with a conventional motor valve 11. In turn, motor valve 11 supports pressure-responsive flow regulator 12, which is conveniently carried in housing 13. As shown in FIGURE 1, face plate 14 of housing 13 presents a pilot pressure indicator 15, a diaphragm pressure indicator 16, an operating pressure adjustment knob 17 and an associated index dial 18.

The operating parts of regulator 12 are contained within housing 13 and, as best seen in FIGURES 4-6, are supported from the inner surface of plate 14 by framing conveniently comprised of channel piece 19 and angle piece 20. Channel piece 19 has one free-standing leg 21 and is therefore reinforced by securing a cross-piece 23 across legs 21 and 22 with bolts 24. To sense pressure variation in the fluid to be controlled, a rolling diaphragm 27 has been secured across centrally located bore 26 in leg 21 of channel 19. This is readily done by bolting flange 30 to leg 21. A tube 29 is then threaded into flange 30 to conduct the actuating fluid to diaphragm 27. A pilot valve 28 is mounted on angle piece 20 and serves to drive motor valve 11 in response to the forces applied to diaphragm 27 by the actuating medium in tube 29 which is normally the fluid to be controlled.

Diaphragm 27 will normally assume the balanced or rest position shown in FIGURE 4. However, when fluid in tube 29 exerts sufficient pressure, diaphragm 27 will expand inwardly of bore 26. Conversely, when the expanding pressure on diaphragm 27 is reduced, diaphragm 27 will move outwardly of bore 26 toward its normal or rest position.

To translate these pressure responsive movements of diaphragm 27 into a force which will operate motor valve 11, a lever and fulcrum assembly 32 is suspended between diaphragm 27 and pilot valve 28. The lever and fulcrum assembly 32 is comprised of a bifurcated arm 33 carrying a transversely disposed knife-edge 34, a spring loaded striker 35 supported from a transverse support 36 and a piston 37 supported from a transverse support 38.

Suspension of assembly 32 between diaphragm 27 and pilot valve 28 is achieved by locating knife-edge 34 in transverse notch 25 of leg 21 and swinging piston 37 into centrally disposed bore 26 of leg 21, thereby locating striker 35 in cooperative relation with pilot valve stem 39. To secure the assembly, a stop bolt 40 is then threaded through base 31 of arm 33 to lie in coaxial spaced relation to shaft 41 of knob 17.

When fluid in tube 29 exerts pressure on diaphragm 27, diaphragm 27 moves inwardly of bore 26, and in so doing drives piston 37. In turn, piston 37 moves support 38 to pivot arm 33 at knife-edge 34, withdrawing striker 35 from valve stem 39 thereby energizing pilot 28 and driving valve 11.

In the embodiments shown in FIGURES 3–6, pilot valve 28 is of the snap-acting type. As shown in FIGURE 3, when this type of pilot valve is in closed position, there is no communication between inlet 42 and outlet 43. As a result, motor valve 11 remains static. However, when striker 35 withdraws from stem 39 the inlet line pressure moves stem 39 to the open position. When this occurs, operating pressure will act on motor valve 11 until striker 35 re-engages and returns stem 39 to the closed position.

A throttling pilot valve 44, such as that shown in FIGURE 8 may be used in place of snap-acting pilot 28. Throttling pilot 44 operates much the same way as snap-acting pilot 28 but does not require the closing force of striker 47 to be buffered through a spring. Stem 45 of pilot 44 is outfitted with an axially disposed magnet 46. Thus, as striker 47 is withdrawn from pilot 44 stem 45 will follow. Unlike pilot 28, when pilot 44 is in closed position, full operating pressure is applied to motor valve 11. When arm 33 is at balance between equal diaphragm and spring pressures, stem 45 will be in partially open position and there will be a small bleed-by of operating pressure and, correspondingly, valve 11 will be static. However, when arm 33 moves stem 45 to either fully closed or fully open position operating pressures on valve 11 will increase or decrease sufficiently to drive valve 11 toward either open or closed position, depending upon the direction and magnitude of the fluid providing the driving pressure.

As shown in FIGURE 2, a preferred form of the device utilizes an extraneous pressure source to operate valve 11. To stabilize action on valve 11 the operating medium (usually an inert gas) passes from its sources through a drier 55 and high and low pressure regulating valves 56 and 57 before entering pilot 28.

As shown in FIGURE 7, the motor valve operating medium passes drier 55 and high and low pressure regulating valves 56 and 57 before acting on motor valve 11. Since this arrangement is of the bleed-by type, it is also desirable to interpose choke 58 as shown to insure bleed-by at pilot 44.

To provide for predetermination of the pressure at which lever and fulcrum assembly 32 will respond to pressure on diaphragm 27, a low rate spring 48 is arranged to oppose the force exerted on piston 37 by diaphragm 27. This is conveniently done by compressing spring 48 between base 31 of arm 33 and traveling nut 49 carried by threaded shaft 41 of adjustment knob 17.

When it is desired to operate at a higher pressure, knob 17 is rotated to move nut 49 toward base 31. This movement of nut 49 compresses spring 48 and increases the force exerted by spring 48 on arm 33 which the diaphragm pressure must overcome to pivot arm 33 and actuate pilot valve 28. Conversely, operating pressure may be decreased by rotating knob 17 to withdraw nut 49 from base 31 thereby expanding spring 48 and decreasing the force exerted on arm 33 by spring 48.

An index dial 18 provides direct read-out of the operating pressure at which the device is set. To accomplish this, the shaft 50 which carries dial 18 is extended through face plate 14 and leg 22 to rotatably terminate in leg 21. At one end of shaft 50 a pair of beveled washers 51 and 52 receive one end of a chain 53. The other end of chain 53 is connected to traveling nut 49. To keep chain 53 taut, shaft 50 is provided with a spring 54. As nut 49 is moved forward to compress spring 48, chain 53 is unwound and shaft 50 and dial 18 are turned. As nut 49 is moved in a decompressing direction, spring 54 turns shaft 50 and dial 18 in the opposite direction, rewinding chain 53. To provide for ready adjustment in chain 53 in order to adjust for variations in the characteristics of spring 48, beveled washers 51 and 52 may be moved closer together or spread further apart thereby changing the effective winding radius presented to chain 53.

From the foregoing, it will be evident that the invention, in its broader aspects, is directed to an improved form of adjustable pressure sensing device which may be employed for controlling various types of operating mechanisms in response to an actuating pressure which may be a fluid or mechanical pressure. Also it will be seen that the fluid to be controlled may be one source of the actuating pressure or may be a different fluid.

The foregoing general and detailed description of the illustrated embodiment has been given solely to facilitate better understanding of the invention itself which will readily admit of a variety of forms and embodiments without departing from the scope of the appended claims.

What is claimed is:

1. A controller for gas-operated motor valves, comprising,
    (a) a housing having a wall,
    (b) a bracket element supported in spaced relation to said wall,
    (c) an opening through said bracket element defining a diaphragm chamber,
    (d) a flexible sealing diaphragm mounted transversely of the chamber,
    (e) conduit means communicating with the chamber on one side of said diaphragm for directing thereagainst the pressure of a fluid to be controlled,
    (f) lever means and fulcrum means mounted for pivotal movement on said bracket element,
    (g) piston means secured to the lever means extending into said chamber into engagement with the opposite side of said diaphragm and operable to translate movement of said diaphragm to corresponding pivotal movement of said lever means,
    (h) spring means disposed in biasing relation between said wall and said lever means,
    (i) adjustment means for varying the biasing force of said spring means, and
    (j) pilot valve means in said housing responsive to the movements of said lever means for correspondingly controlling operating gas flow to a motor valve.

2. A controller according to claim 1 wherein said adjustment means includes a threaded shaft rotatably extending through said wall, a travelling nut threadably mounted on the shaft in engagement with said spring means.

3. A controller according to claim 2 including read-out means on the housing driven by the rotations of said travelling nut to indicate the operating pressure of the controller.

4. A controller according to claim 1 wherein said lever means is of bifurcated form having spaced apart arms disposed on opposite sides of said bracket element, and said fulcrum means includes a knife-edge element mounted transversely between said arms, and a knife-edge receiving groove in said bracket element.

5. A controller according to claim 1 wherein said pilot valve means is of the snap-acting type.

6. A controller according to claim 1 where said pilot valve means is of the throttling type.

7. A controller according to claim 1 wherein said diaphragm is a rolling diaphragm.

References Cited by the Examiner

UNITED STATES PATENTS

| | | | |
|---|---|---|---|
| 1,079,600 | 11/1913 | Kennedy | 137—505.42 |
| 1,110,320 | 9/1914 | Fulton | 137—488 |
| 2,051,028 | 8/1936 | Crandall | 137—505.42 XR |
| 2,313,564 | 3/1943 | Manly | 137—505.42 XR |
| 2,891,784 | 6/1959 | Taylor | 137—116.5 XR |
| 3,132,661 | 5/1964 | Flesor et al. | 137—85 |

FOREIGN PATENTS 67,968  8/1928  Sweden.

M. CARY NELSON, *Primary Examiner.*

R. J. MILLER, *Assistant Examiner.*